(12) United States Patent
Yamauchi et al.

(10) Patent No.: US 11,453,401 B2
(45) Date of Patent: Sep. 27, 2022

(54) CLOSED EYE DETERMINATION DEVICE

(71) Applicants: TOYOTA JIDOSHA KABUSHIKI KAISHA, Toyota (JP); AISIN SEIKI KABUSHIKI KAISHA, Kariya (JP)

(72) Inventors: Koichiro Yamauchi, Kariya (JP); Takuya Sakata, Kariya (JP); Taku Mitsumori, Kariya (JP); Kimimasa Tamura, Komae (JP); Masataka Sano, Tokyo-to (JP); Yosuke Morino, Nisshin (JP)

(73) Assignees: TOYOTA JIDOSHA KABUSHIKI KAISHA, Toyota (JP); AISIN SEIKI KABUSHIKI KAISHA, Kariya (JP)

( * ) Notice: Subject to any disclaimer, the term of this patent is extended or adjusted under 35 U.S.C. 154(b) by 33 days.

(21) Appl. No.: 17/007,385

(22) Filed: Aug. 31, 2020

(65) Prior Publication Data
US 2021/0070306 A1 Mar. 11, 2021

(30) Foreign Application Priority Data

Sep. 5, 2019 (JP) .............................. JP2019-162079

(51) Int. Cl.
*B60W 40/08* (2012.01)
*G06V 20/59* (2022.01)
(Continued)

(52) U.S. Cl.
CPC ............ *B60W 40/08* (2013.01); *G06V 20/597* (2022.01); *G06V 40/171* (2022.01); *G06V 40/19* (2022.01);
(Continued)

(58) Field of Classification Search
CPC ......... B60W 40/08; B60W 2040/0827; B60W 2540/229; B60W 2050/143; B60W 50/14;
(Continued)

(56) References Cited

U.S. PATENT DOCUMENTS 10,331,942 B2 * 6/2019 Wong ................. G06K 9/00281
2009/0268022 A1 * 10/2009 Omi .......................... A61B 5/18
348/135
(Continued)

FOREIGN PATENT DOCUMENTS

JP 2000198369 A 7/2000
JP 2000199703 A 7/2000
(Continued)

*Primary Examiner* — Omar Casillashernandez
(74) *Attorney, Agent, or Firm* — Dickinson Wright, PLLC (57) ABSTRACT

A closed eye determination device includes an eye opening degree detection unit that detects a degree of eye opening of a driver from each of a series of face images of a driver in time series in a latest certain period of time being acquired by a driver monitor camera, a local minimum value extraction unit that extracts a local minimum value of the degree of eye opening from a change in time series of the degree of eye opening in the certain period of time, a reference lower limit value-setting unit that sets, as a reference lower limit value of the degree of eye opening, a local minimum value in order corresponding to a blinking number of the driver in the certain period of time in order from the smallest local minimum value among local minimum values of the degree of eye opening in the certain period of time, a threshold value setting unit that sets a closed eye determination threshold value, based on the reference lower limit value, and a closed eye determination unit that determines that an eye of the driver is closed when the degree of eye opening detected from an image acquired by the driver monitor camera after the certain period of time is less than or equal to the closed eye determination threshold value.

2 Claims, 7 Drawing Sheets

(51) Int. Cl.
    *G06V 40/19* (2022.01)
    *G06V 40/16* (2022.01)
(52) U.S. Cl.
    CPC .............. *B60W 2040/0827* (2013.01); *B60W 2540/229* (2020.02)
(58) Field of Classification Search
    CPC ...... B60W 2040/0872; G06K 9/00281; G06K 9/00604; G06K 9/00845; G06K 9/0061
    USPC .......................................................... 340/576
    See application file for complete search history.

(56) References Cited

U.S. PATENT DOCUMENTS

| | | | |
|---|---|---|---|
| 2011/0216181 A1* | 9/2011 | Yoda | A61B 5/1103 348/78 |
| 2011/0235919 A1 | 9/2011 | Morita et al. | |
| 2014/0147019 A1* | 5/2014 | Hanita | G06T 7/13 382/117 |
| 2016/0262682 A1* | 9/2016 | Omi | B60K 28/06 |

FOREIGN PATENT DOCUMENTS

| | | |
|---|---|---|
| JP | 2004041485 A | 2/2004 |
| JP | 2008140266 A | 6/2008 |
| JP | 2008210285 A | 9/2008 |
| JP | 2010142345 A | 7/2010 |

* cited by examiner

CLOSED EYE DETERMINATION DEVICE

FIELD OF THE INVENTION

The present invention relates to a closed eye determination device that determines a closed eye of an eye.

BACKGROUND OF THE INVENTION

In Japanese Unexamined Patent Application Publication No. 2010-142345, for example, it has been proposed in the related art that an expression of a person to be imaged is estimated from a face image, a degree of eye opening of the person to be imaged is acquired from the face image, a threshold value of the degree of eye opening is set based on the estimated expression, and an eye being open is determined when the degree of eye opening exceeds the threshold value.

Further, in Japanese Unexamined Patent Application Publication No. 2000-198369, it has been proposed that a maximum value and a minimum value of a degree of opening of an eye are learned based on a change in time series of a value of the degree of opening of the eye, and a reference value using determination of eye opening/closing is set.

SUMMARY OF THE INVENTION

A degree of eye opening when an eye is closed is not necessarily a constant value, and fluctuates within a range of variations. However, the techniques described in Japanese Unexamined Patent Application Publication No. 2010-142345 and Japanese Unexamined Patent Application Publication No. 2000-198369 described above do not take variations in degree of eye opening when an eye is closed into consideration, and thus a degree of eye opening may exceed a threshold value of a closed eye determination even though an eye is closed. Thus, there is a possibility that detection of an eye being closed may fail.

Therefore, an object of the present invention is to provide a closed eye determination device capable of accurately determining that an eye is closed.

The present invention was made so as to solve the above problem and has as its gist the following.

(1) A closed eye determination device, comprising:
  a processor configured to:
  detect a degree of eye opening of a driver from each of a series of face images of a driver in time series in a latest certain period of time being acquired by an imaging device;
  extract a local minimum value of the degree of eye opening from a change in time series of the degree of eye opening in the certain period of time;
  set, as a reference lower limit value of the degree of eye opening, a local minimum value in order corresponding to a blinking number of a driver in the certain period of time in order from a smallest local minimum value among local minimum values of the degree of eye opening in the certain period of time;
  set a closed eye determination threshold value, based on the reference lower limit value; and
  determine that an eye of a driver is closed when the degree of eye opening detected from an image acquired by the imaging device after the certain period of time is less than or equal to the closed eye determination threshold value.

(2) The closed eye determination device according to above (1), the processor further configured to set, as a reference upper limit value of the degree of eye opening, a maximum value of the degree of eye opening in the certain period of time, wherein the processor sets, as the closed eye determination threshold value, a value acquired by adding a predetermined ratio of a difference between the reference upper limit value and the reference lower limit value to the reference lower limit value.

(3) The closed eye determination device according to above (2), the processor further configured to detect a sleepiness level of a driver, wherein the processor sets the predetermined ratio to be lower at a higher sleepiness level of a driver, and the processor updates the reference upper limit value to the maximum value in the certain period of time when the sleepiness level is less than or equal to a predetermined level, and does not update the reference upper limit value when the sleepiness level exceeds the predetermined level.

(4) The closed eye determination device according to above (3), wherein the processor updates the reference upper limit value to the maximum value in the certain period of time regardless of the sleepiness level when the certain period of time is a period immediately after driving of a vehicle starts.

The closed eye determination device according to the present invention has an effect capable of accurately determining that an eye is closed.

DESCRIPTION OF EMBODIMENTS

1. Configuration of Closed Eye Determination System

Hereinafter, a closed eye determination system according to one embodiment will be described with reference to the drawings. For example, the closed eye determination system is installed in a vehicle, and is used in a driving assistance system for assisting in driving of a driver. As one example, the closed eye determination system is installed in a vehicle that enables traveling (hands-off traveling) while a driver drives the vehicle with no hands on a steering wheel. As such traveling, for example, traveling at approximately a level 2 or a level 3 set by society of automotive engineers (SAE) is assumed.

A driver may be brought into an inappropriate state of driving a vehicle during traveling of the vehicle. Examples of such an inappropriate state include a state where a driver dozes off. Thus, the closed eye determination system monitors a state of a driver by a driver monitor camera, and determines a closed eye of the driver. In this way, when the eye of the driver is closed for a certain continuous period of time, for example, based on an eye closing state of the driver, the closed eye determination system can determine that the driver dozes off or has a wakefulness state decreasing, and give a warning and the like to the driver.

Figure 1:
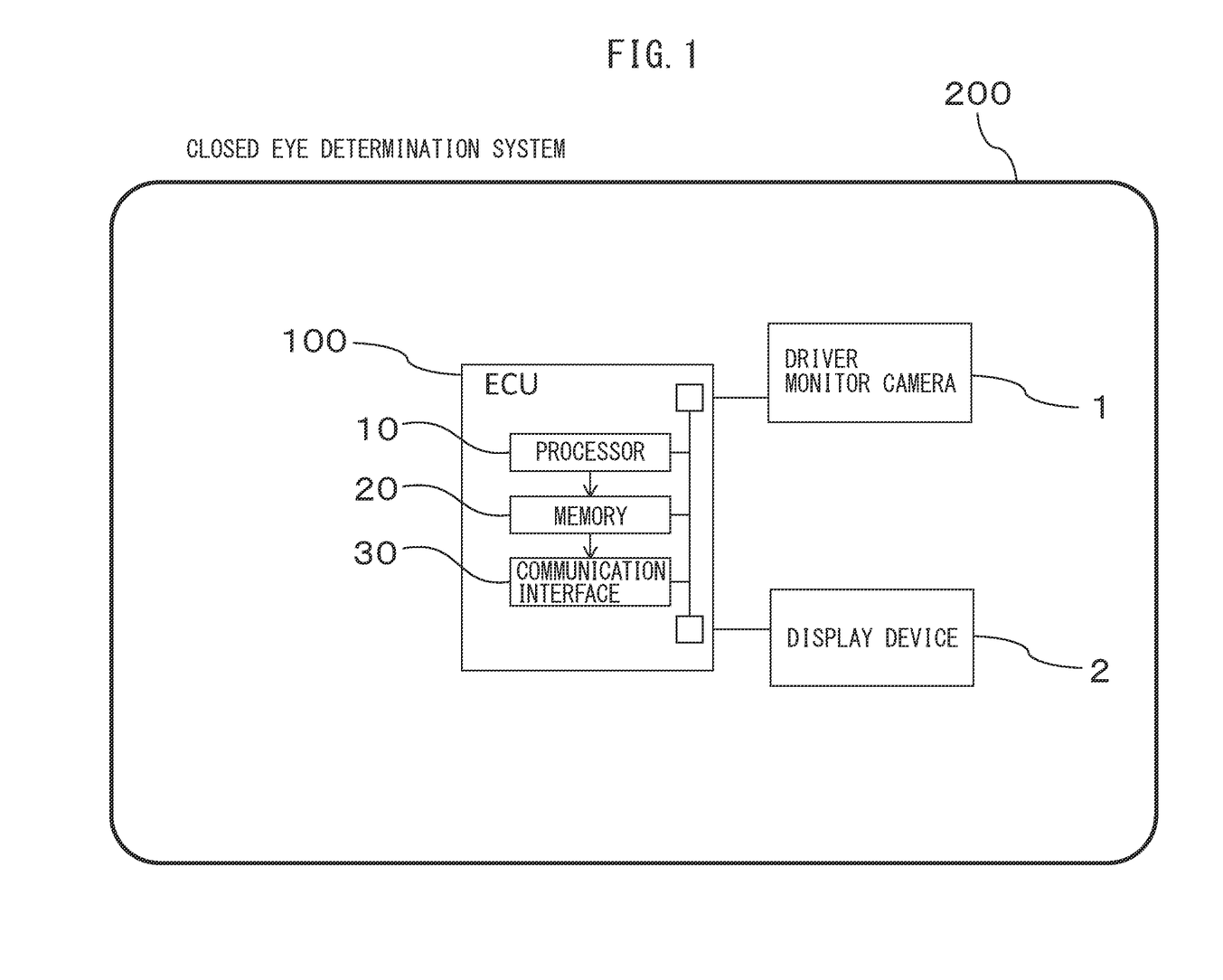
FIG. 1 is a schematic configuration diagram of a closed eye determination system according to one embodiment.

FIG. 1 is a schematic configuration diagram of a closed eye determination system 200 according to one embodiment. The closed eye determination system 200 determines a closed eye of an eye of a crew member such as a driver. The closed eye determination system 200 includes a driver monitor camera (imaging device) 1 that generates a face image by imaging a face of a driver, a display device 2 that displays a warning and the like for the driver, and a control device (ECU) 100 that determines the closed eye of the eye of the driver. Each of the driver monitor camera 1, the display device 2, and the control device 100 is communicably connected via an in-vehicle network conforming to a standard such as a controller area network (CAN).

The driver monitor camera 1 includes a two-dimensional detector configured with an array of photoelectric conversion elements having sensitivity to visible light, such as a CCD or a C-MOS, and an imaging optical system that forms an image of a region to be imaged on the two-dimensional detector. The driver monitor camera 1 is provided on a dashboard inside a vehicle, near a windshield, or the like in such a way as to face an assumed position of a driver, and images a face of the driver. The driver monitor camera 1 images the driver at every predetermined imaging period (for example, 1/30 seconds to 1/10 seconds), and generates an image in which the driver is captured. Note that the image acquired by the driver monitor camera 1 is preferably a color image. Every time the driver monitor camera 1 generates an image, the driver monitor camera 1 outputs the generated image to the control device 100 via the in-vehicle network.

The control device 100 is a component that controls the entire closed eye determination system 200, and is one aspect of a closed eye determination device. The control device 100 includes a processor 10, a memory 20, and a communication interface 30. The processor 10 includes one or a plurality of central processing units (CPUs) and a peripheral circuit thereof. The processor 10 may further include another arithmetic circuit such as a logical arithmetic unit, a numerical arithmetic unit, or a graphic processing unit. The memory 20 is one example of a storage unit, includes, for example, a volatile semiconductor memory and a non-volatile semiconductor memory, and stores data related to processing according to the present embodiment as necessary. The communication interface 30 is one example of a communication unit, and includes an interface circuit for connecting the control device 100 to the in-vehicle network.

Figure 2:
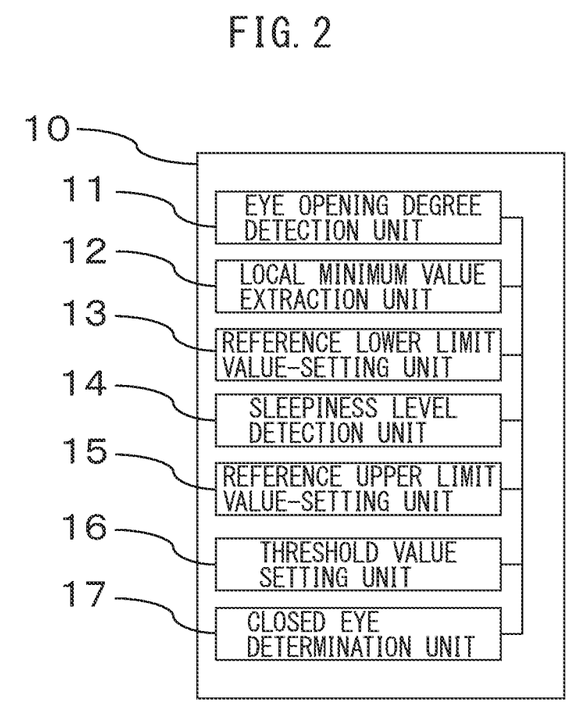
FIG. 2 is a schematic diagram illustrating a functional block of a processor of a control device.

FIG. 2 is a schematic diagram illustrating a functional block of the processor 10 of the control device 100. The processor 10 of the control device 100 includes an eye opening degree detection unit 11, a local minimum value extraction unit 12, a reference lower limit value-setting unit 13, a sleepiness level detection unit 14, a reference upper limit value-setting unit 15, a threshold value setting unit 16, and a closed eye determination unit 17. Each of the units included in the processor 10 is, for example, a functional module achieved by a computer program operating on the processor 10. In other words, a functional block of the processor 10 is constituted from the processor 10 and a program (software) for causing the processor 10 to function. Further, the program may be recorded in the memory 20 included in the control device 100 or a recording medium connected from the outside. Alternatively, each of the units included in the processor 10 may be a dedicated arithmetic circuit provided in the processor 10.

Figure 3:
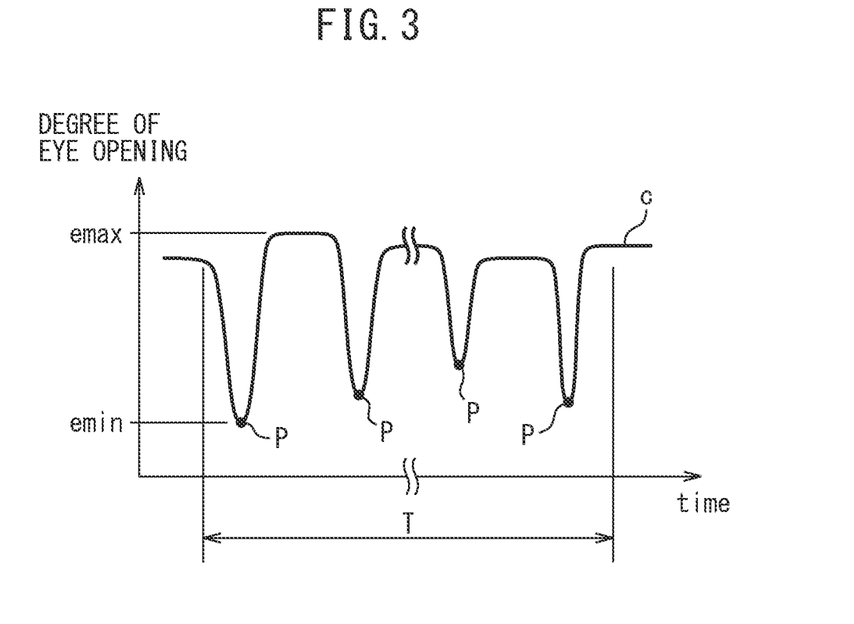
FIG. 3 is a schematic diagram illustrating a degree of eye opening in time series.

In the closed eye determination system 200 configured as described above, the eye opening degree detection unit 11 of the processor 10 detects a degree of eye opening of an eye of a driver, based on image information generated by the driver monitor camera 1. FIG. 3 is a schematic diagram illustrating a time change c of a degree of eye opening detected by the eye opening degree detection unit 11. In FIG. 3, a horizontal axis indicates the time, and a vertical axis indicates the degree of eye opening. The eye opening degree detection unit 11 detects the degree of eye opening of a driver from each of a series of face images of a driver in time series in the latest certain period of time T.

When the eye opening degree detection unit 11 detects the degree of eye opening, first, the eye opening degree detection unit 11 detects an eye of the driver from image information generated by the driver monitor camera 1, and detects a contour of the eye. Examples of a method for detecting a contour of the eye from image information include a technique for optimizing (fitting) a model parameter in such a way that a distance between a face model (PDM) modeled by three-dimensional coordinate data and a feature point extracted from a face image becomes minimum, which is described in a document (TAKANO Hiroyuki and DEGUCHI Koichiro, "Use of Facial Contour for Handling Posture Change in Face Alignment by Contour", Information Processing Society of Japan Technical Report, Sep. 2, 2012), for example. By this technique, a three-dimensional position of the contour of the eye is acquired from the optimized model parameter.

When obtaining a three-dimensional position of the contour of the eye, the eye opening degree detection unit 11 detects the degree of eye opening from a distance between an upper eyelid and a lower eyelid. Alternatively, the eye opening degree detection unit 11 may acquire the degree of eye opening from a length-to-width ratio of the eye. Then, the closed eye determination unit 17 compares the degree of eye opening detected by the eye opening degree detection unit 11 with a closed eye determination threshold value, and determines a closed eye when the degree of eye opening is less than or equal to the closed eye determination threshold value. Note that a technique for detecting a degree of eye opening is not limited to the technique described above, and a degree of eye opening may be acquired by appropriately applying another known technique such as the techniques described in PTL 1 and PTL 2 described above, for example.

2. Dynamic Setting of Closed Eye Determination Threshold Value Based on Reference Upper Limit Value and Reference Lower Limit Value As described above, a closed eye is determined when a degree of eye opening is less than or equal to a closed eye determination threshold value, based on a comparison between the degree of eye opening and the closed eye determination threshold value. At this time, when the closed eye determination threshold value for determining a closed eye of a driver is a fixed value, a size of an eye under a normal condition varies from individual to individual. Thus, in a case of a person with a small eye under a normal condition, a degree of eye opening is more likely to be less than or equal to the closed eye determination threshold value, and a closed eye may be determined even though the eye is not closed.

Further, a degree of eye opening may not be detected as 0 due to an individual difference of an eye of a driver even when the driver closes the eye. Thus, when the closed eye determination threshold value is a fixed value, a degree of eye opening becomes greater than the closed eye determination threshold value even though an eye is actually closed, and a closed eye determination may not be able to be properly performed.

For this reason, in the present embodiment, the threshold value setting unit 16 sets a closed eye determination threshold value by dynamically changing the closed eye determination threshold value between a reference upper limit value and a reference lower limit value of a degree of eye opening.

Figure 4:
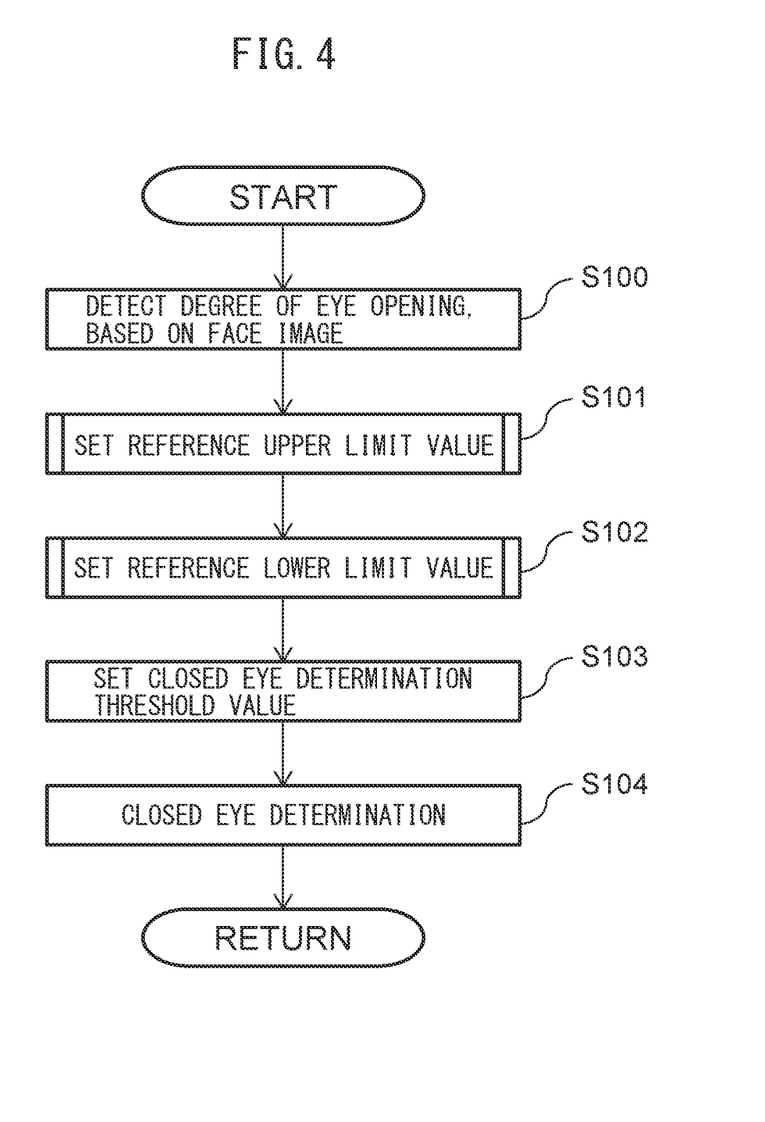
FIG. 4 is a flowchart illustrating processing of dynamically changing a closed eye determination threshold value between a maximum value and a minimum value of a degree of eye opening.

FIG. 4 is a flowchart illustrating processing of performing a closed eye determination by dynamically changing a closed eye determination threshold value between a reference upper limit value and a reference lower limit value of a degree of eye opening. The processing in FIG. 4 is performed at each predetermined control period by the processor 10 of the control device 100. First, the eye opening degree detection unit 11 of the processor 10 acquires a face image generated by the driver monitor camera 1, and detects a degree of eye opening, based on the face image (step S100).

Next, the reference upper limit value-setting unit 15 sets, as a reference upper limit value, a maximum value of the degree of eye opening in the latest certain period of time T (step S101). In FIG. 3, emax is set as the reference upper limit value. A value of the reference upper limit value is successively updated with a lapse of time. Further, the reference upper limit value-setting unit 15 does not update a value of the reference upper limit value when a sleepiness level exceeds a predetermined level. Processing of setting the reference upper limit value will be described below in detail.

Next, the reference lower limit value-setting unit 13 sets a reference lower limit value (step S102). The reference lower limit value-setting unit 13 sets the reference lower limit value from among local minimum values of the degree of eye opening related to blinks during the latest certain period of time T. Processing of setting the reference lower limit value will be described below in detail.

Next, the threshold value setting unit 16 sets a closed eye determination threshold value (step S103). The closed eye determination threshold value is dynamically set within a range between the reference upper limit value and the reference lower limit value. For example, the closed eye determination threshold value is calculated from the following equation (1).

Closed eye determination threshold value=(reference upper limit value−reference lower limit value)× coefficient+reference lower limit value  (1)

A value of the coefficient in the equation (1) is set to a value of approximately 0.3 to 0.4 as one example. When the coefficient is 0.5, the closed eye determination threshold value is an intermediate value between the reference upper limit value and the reference lower limit value.

Next, the closed eye determination unit 17 performs a closed eye determination, based on the closed eye determination threshold value (step S104). When the degree of eye opening detected from the image generated by the driver monitor camera 1 after the latest certain period of time T is less than or equal to the closed eye determination threshold value, the closed eye determination unit 17 determines that an eye of a driver is closed. After step S104, the processing is terminated.

According to the processing in FIG. 4, a reference upper limit value and a reference lower limit value are detected from information about a degree of eye opening in the latest certain period of time T, and a closed eye determination threshold value is dynamically set between the reference upper limit value and the reference lower limit value. By setting the reference upper limit value from past information about the degree of eye opening and setting the closed eye determination threshold value, a closed eye determination that does not depend on a size of an eye under a normal condition for each individual can be achieved. Further, by setting the reference lower limit value from past information about the degree of eye opening and setting the closed eye determination threshold value, a false determination due to variations in the degree of eye opening when a driver closes an eye can be suppressed. In this way, accuracy of a closed eye determination can be improved.

3. Setting of Reference Lower Limit Value Based on Local Minimum Value of Degree of Eye Opening Next, the processing of setting a reference lower limit value by the reference lower limit value-setting unit 13 in step S102 in FIG. 4 will be described. In setting the reference lower limit value, first, the local minimum value extraction unit 12 of the processor 10 extracts a local minimum value of a degree of eye opening related to a blink during the latest certain period of time T.

As illustrated in FIG. 3, a plurality of peaks P at which the degree of eye opening protrudes downward due to a blink are present during the latest certain period of time T. The degree of eye opening at the peak P fluctuates within a range of variations. Since the number of blinks of an adult is generally approximately 15 to 20 times/min, a predicted blinking number N included in the latest certain period of time T illustrated in FIG. 3 is previously calculated, based on the number of blinks of an adult, and is stored in the memory 20. The local minimum value extraction unit 12 extracts a plurality of local minimum values related to the peaks P protruding downward from the time change c of the degree of eye opening in the latest certain period of time T. Then, the reference lower limit value-setting unit 13 sorts the plurality of local minimum values in ascending order from the smallest local minimum value, and sets, as a reference lower limit value, an N-th local minimum value from the sorted leading local minimum value.

The reference lower limit value is set by this method, and thus the reference lower limit value is set by using a value corresponding to a maximum value among the plurality of local minimum values related to blinks in the certain period of time T. Then, since a closed eye determination threshold value is set between the reference lower limit value and a reference upper limit value, the closed eye determination threshold value is greater than the reference lower limit value, and all blinks in the certain period of time T can be determined as closed eyes. Therefore, it is never determined that an eye is not closed even though the eye is closed, and a closed eye determination can be accurately performed.

Note that, when a local minimum value being present during the latest certain period of time T does not reach the predicted blinking number N, the reference lower limit value-setting unit 13 may use, at a current control period, a reference lower limit value being set at a previous control period and stored in the memory 20.

Further, the reference lower limit value-setting unit 13 may set, as the reference lower limit value, an N'-th local minimum value from the smallest local minimum value among local minimum values sorted in ascending order as an order corresponding to a value N' acquired by multiplying the predicted blinking number N in the certain period of time T by a predetermined safety factor k (k<1). It is assumed that a value of the safety factor k is approximately 0.7 to 0.9, for example. In this way, even when a local minimum value being present during the latest certain period of time T does not reach the predicted blinking number N, the reference lower limit value can be set.

As described above, it is assumed that a degree of eye opening becomes a local minimum value every time a driver blinks. Thus, by setting a closed eye determination threshold value with reference to a local minimum value in order corresponding to the predicted blinking number N in the certain period of time T when counting from a smallest value of the local minimum value of the degree of eye opening, the degree of eye opening when an eye is closed by a blink can be set in such a way as not to exceed the closed eye determination threshold value even in a case in which the degree of eye opening when the eye is closed for each blink varies. Therefore, an eye being closed can be accurately determined regardless of an individual difference among drivers.

In setting a closed eye determination value, for example, as described in PTL 2 mentioned above, in a case in which the closed eye determination threshold value is simply set by using a past smallest degree of eye opening (emin illustrated in FIG. 3), the closed eye determination threshold value may be set to be excessively small due to a decrease in the smallest degree of eye opening emin when the smallest degree of eye opening emin fluctuates within a range of variations. In this case, it may not be determined that an eye is closed even though the eye is closed, and there is a concern that the closed eye determination cannot be properly performed.

In the present embodiment, the reference lower limit value is set by the above-mentioned method, and thus the reference lower limit value is set by using a value corresponding to a maximum value among the plurality of local minimum values related to blinks in the certain period of time T. Accordingly, the closed eye determination can be accurately performed without being affected by fluctuations due to variations in the smallest degree of eye opening.

Figure 5:
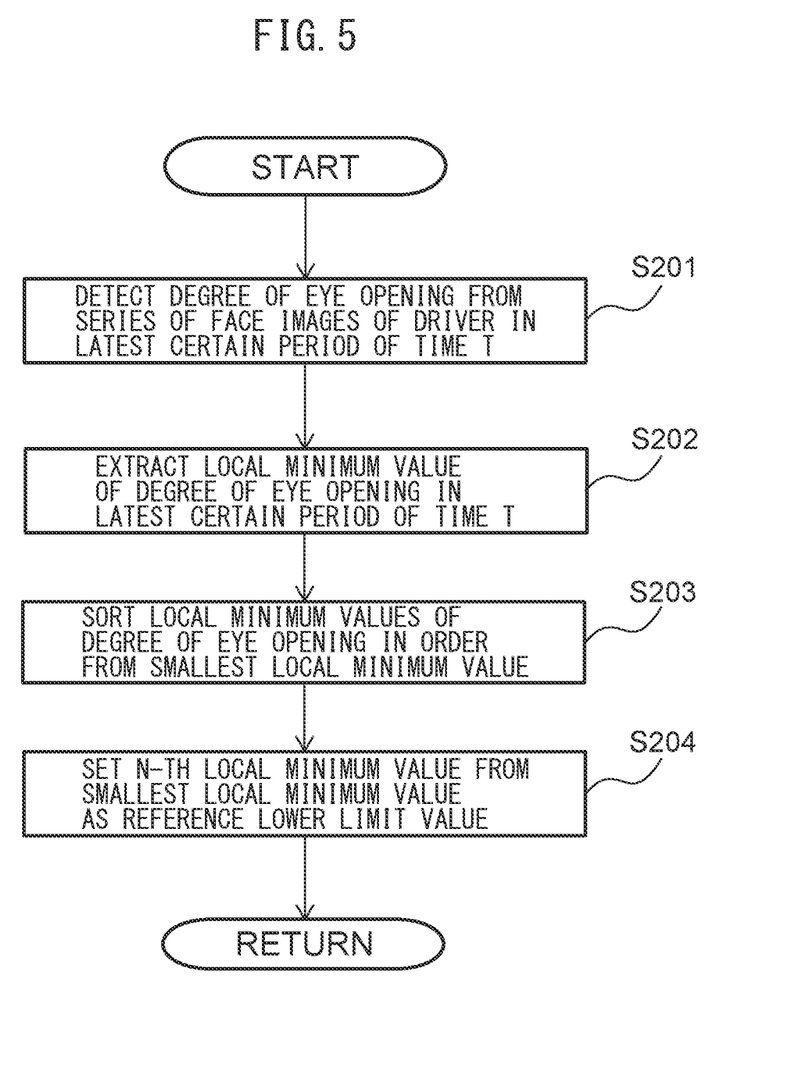
FIG. 5 is a flowchart illustrating processing of setting a reference lower limit value.

FIG. 5 is a flowchart illustrating processing of setting a reference lower limit value. The processing in FIG. 5 is performed at each predetermined control period by the processor 10 of the control device 100. First, the eye opening degree detection unit 11 of the processor 10 detects a degree of eye opening from a series of face images of a driver in the latest certain period of time T (step S201). In this way, a characteristic of the degree of eye opening illustrated in FIG. 3 is acquired. Next, the local minimum value extraction unit 12 extracts a local minimum value of the degree of eye opening in the latest certain period of time T from the time change c of the degree of eye opening in FIG. 3 (step S202).

Next, the reference lower limit value-setting unit 13 sorts local minimum values of the degree of eye opening in ascending order from the smallest local minimum value (step S203), and sets, as a reference lower limit value, an N-th local minimum value from the smallest local minimum value, based on a predicted number N of blinks in the certain period of time T that is previously stored in the memory 20 (step S204). After step S204, the processing is terminated.

As described above, a blinking number in the certain period of time T is set to N and an N-th local minimum value from the smallest local minimum value among a plurality of local minimum values in the certain period of time T is set as a reference lower limit value, and thus a closed eye determination threshold value becoming excessively small can be suppressed. Therefore, the closed eye determination can be accurately performed.

4. Setting of Reference Upper Limit Value According to Sleepiness Level

Next, the processing of setting a reference upper limit value by the reference upper limit value-setting unit 15 in step S101 in FIG. 4 will be described.

Figure 6:
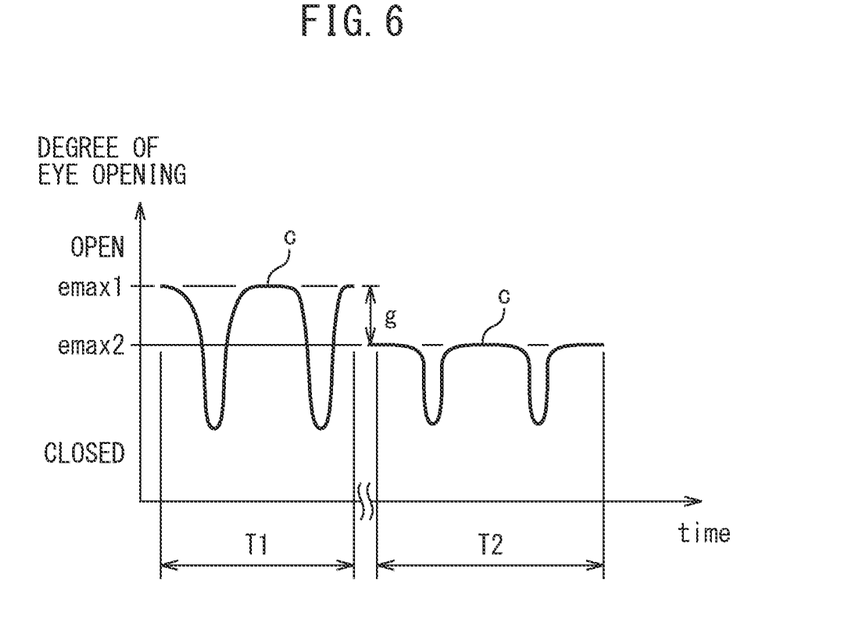
FIG. 6 is a characteristic diagram illustrating a situation where a maximum degree of eye opening changes in response to sleepiness of a driver.

A maximum value emax of the degree of eye opening illustrated in FIG. 3 becomes smaller when a driver feels sleepiness. FIG. 6 is a characteristic diagram illustrating a situation where the maximum value emax of the degree of eye opening changes in response to sleepiness of a driver. In FIG. 6, a horizontal axis indicates the time, and a vertical axis indicates the degree of eye opening.

FIG. 6 illustrates a period T1 in which the driver does not feel sleepiness and a period T2 in which the driver feels sleepiness. In a time change c of the degree of eye opening illustrated in FIG. 6, a gap g is generated between a maximum value emax1 of the degree of eye opening in the period T1 and a maximum value emax2 of the degree of eye opening in the period T2. In this way, when the driver feels sleepiness, the maximum value of the degree of eye opening decreases.

Thus, with the maximum value of the degree of eye opening in the latest certain period of time T being set as a reference upper limit value, when the maximum value emax2 of the degree of eye opening decreases in the period T2 in which the driver feels sleepiness, a closed eye determination threshold value calculated from the equation (1) becomes smaller than that in the period T2 in which the driver does not feel sleepiness. Then, when the closed eye determination threshold value having a value smaller than that under a normal condition due to the driver feeling sleepiness is used, a closed eye determination cannot be accurately performed.

Thus, the sleepiness level detection unit 14 of the processor 10 detects a sleepiness level of a driver from a series of face images of the driver in the latest certain period of time T. The sleepiness level detection unit 14 may calculate a weighted integrated value, by using the technique described in Japanese Unexamined Patent Application Publication No. 2008-212298 for example, by calculating a weighted degree of eye opening from the degree of eye opening detected by the eye opening degree detection unit 11 and integrating the weighted degree of eye opening, and may detect the sleepiness level from the weighted integrated value. Further, the sleepiness level detection unit 14 may be constituted of a classifier that detects the sleepiness level by machine learning, based on information such as an orientation of a face of a driver, a line-of-sight direction, a degree of eye opening, and a degree of opening (size of a mouth) being acquired from a face image generated by the driver monitor camera 1.

For example, the sleepiness level detection unit 14 classifies a sleepiness level into five stages of a level 1 to a level 5, and detects which of the five stages the sleepiness level of a driver corresponds to. Note that sleepiness decreases with a smaller numerical value of the level.

When the reference upper limit value-setting unit 15 sets, as the reference upper limit value, the maximum value of the degree of eye opening in the latest certain period of time, the reference upper limit value-setting unit 15 updates the reference upper limit value only in a case in which a sleepiness level of a driver is less than or equal to a predetermined level (in a case in which sleepiness of the driver is lower than the predetermined level) in the latest certain period of time T. In this way, a decrease in the reference upper limit value due to the driver feeling sleepiness can be suppressed. Therefore, when a closed eye determination threshold value is calculated based on the equation (1), the closed eye determination threshold value becoming excessively small is suppressed.

Note that it is conceivable that a driver does not basically feel sleepiness immediately after driving of a vehicle by the driver starts. Thus, when the latest certain period of time T is a period immediately after driving starts, the reference upper limit value-setting unit 15 sets a maximum value of a degree of eye opening in the certain period of time T as an initial value of a reference upper limit value regardless of a sleepiness level.

Further, when a maximum value of a degree of eye opening decreases due to a driver feeling sleepiness, other determination based on the maximum value of the degree of eye opening cannot be accurately performed. For example, when the maximum value of the degree of eye opening is updated in time series, a state where an eyelid grows heavily, a half-closed eye state, and the like can be determined based on the maximum value. However, when the maximum value of the degree of eye opening decreases due to a driver feeling sleepiness, the states cannot be accurately determined. In the present embodiment, a reference upper limit value is updated to the maximum value of the degree of eye opening in the latest certain period of time by the above-described processing only when a sleepiness level is less than or equal to a predetermined level, and thus the reference upper limit value does not decrease in response to the sleepiness level. Therefore, a state where an eyelid slightly grows heavily or a half-closed eye state can be accurately detected based on the reference upper limit value. Note that a degree of eye opening in the state where an eyelid slightly grows heavily corresponds to approximately 0.7 times a maximum degree of eye opening in a state where a driver does not feel sleepiness. Further, a degree of eye opening in the half-closed eye state corresponds to approximately 0.5 times the maximum degree of eye opening in the state where the driver does not feel sleepiness.

Figure 7:
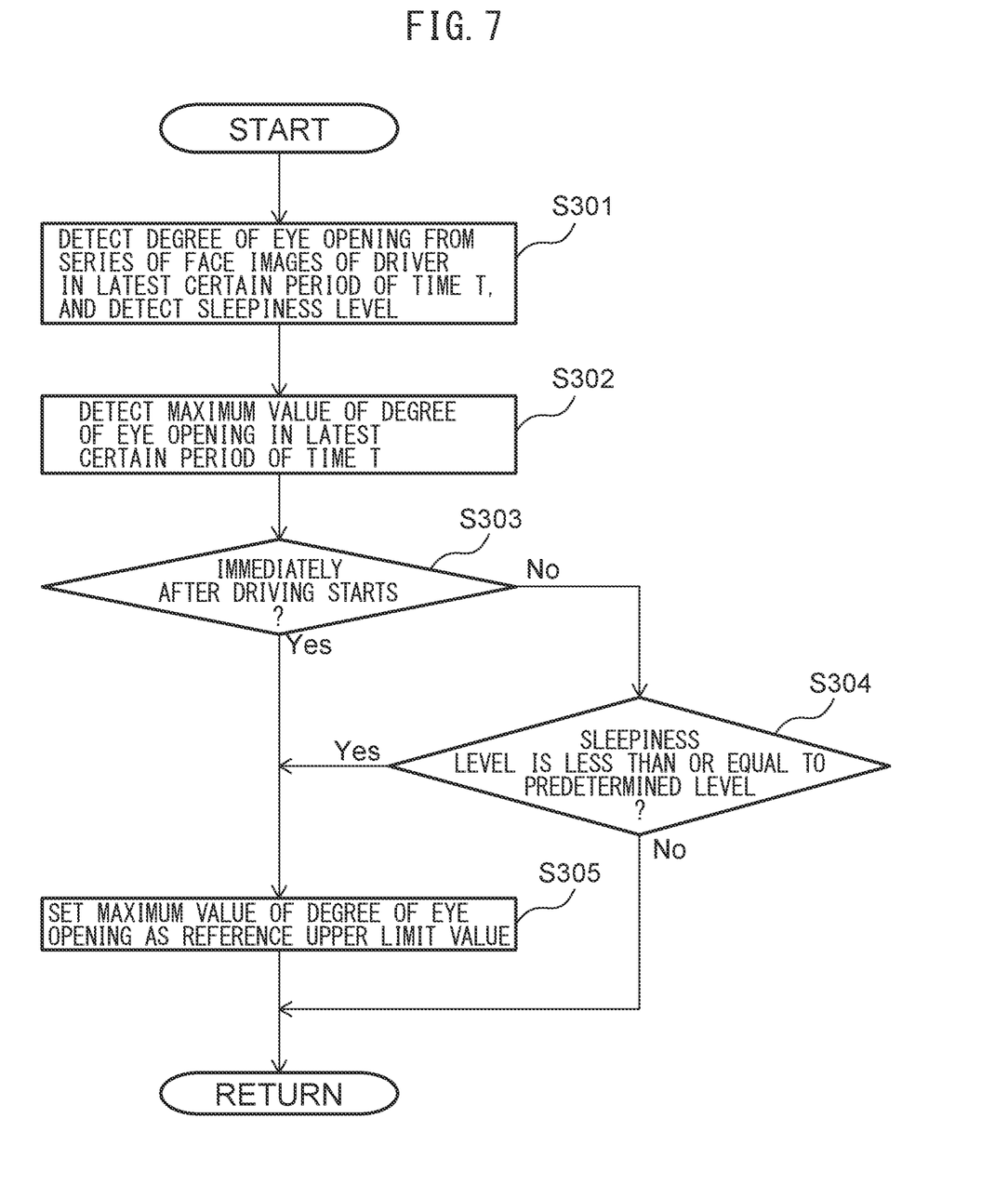
FIG. 7 is a flowchart illustrating processing of setting a reference upper limit value.

FIG. 7 is a flowchart illustrating processing of setting a reference upper limit value. The processing in FIG. 7 is also performed at each predetermined control period by the processor 10 of the control device 100. First, a degree of eye opening is detected from a series of face images of a driver in the latest certain period of time T, and a sleepiness level of the driver is detected (step S301). The detection of the degree of eye opening is performed by the eye opening degree detection unit 11, and the detection of the sleepiness level is performed by the sleepiness level detection unit 14. Next, the reference upper limit value-setting unit 15 detects a maximum value (emax illustrated in FIG. 3) of the degree of eye opening in the latest certain period of time T (step S302).

Next, the reference upper limit value-setting unit 15 determines whether it is immediately after driving of a vehicle starts (step S303). When it is immediately after driving starts, the reference upper limit value-setting unit 15 sets, as a reference upper limit value, the maximum value of the degree of eye opening in the latest certain period of time T immediately after driving starts (step S305). After step S305, the processing is terminated.

Further, when it is not immediately after driving starts in step S303, the reference upper limit value-setting unit 15 determines whether the sleepiness level of the driver detected by the sleepiness level detection unit 14 is less than or equal to a predetermined level (step S304). Then, when the sleepiness level is less than or equal to the predetermined level, the reference upper limit value-setting unit 15 sets, as the reference upper limit value, the maximum value of the degree of eye opening in the latest certain period of time T (step S305). For example, the reference upper limit value-setting unit 15 sets the predetermined level to the level 2 among the five stages described above, and, when the sleepiness level is the level 2 or the level 1, the reference upper limit value-setting unit 15 sets, as the reference upper limit value, the maximum value of the degree of eye opening in the latest certain period of time T. After step S305, the processing is terminated.

Further, when the sleepiness level exceeds the predetermined level in step S304, the processing is terminated. Therefore, in this case, the reference upper limit value calculated at a previous control period is maintained without being updated.

According to the processing in FIG. 7, when a maximum value of a degree of eye opening in the latest certain period of time T is set as a reference upper limit value, the reference upper limit value is updated only in a case in which a sleepiness level of a driver is less than or equal to a predetermined level, and thus a decrease in the reference upper limit value due to sleepiness can be avoided. Therefore, a decrease in a closed eye determination threshold value calculated based on the reference upper limit value can be suppressed, and accuracy of a closed eye determination can be improved. Further, a state where an eyelid slightly grows heavily, a half-closed eye state, and the like can be accurately detected based on the reference upper limit value.

As described above, since a degree of eye opening when a driver opens an eye changes in response to a sleepiness level, the eye being closed can be accurately determined regardless of an individual difference of the driver and a state of the driver by setting a closed eye determination threshold value with reference to a maximum value of the degree of eye opening in a certain period of time in which the sleepiness level is less than or equal to a predetermined level.

5. Modification Example

Next, various modification examples of the present embodiment will be described. In the present embodiment described above, a value of the coefficient in the equation (1) is a fixed value, but a value of the coefficient in the equation (1) may change in response to a degree of wakefulness (sleepiness level) of a driver. For example, when a driver is awake, a value of the coefficient is assumed to be 0.5, and, when a driver is sleepy, the coefficient is assumed to be 0.3. A maximum value and a minimum value of a degree of eye opening decreases as a driver is sleepy, and thus a closed eye determination can be accurately performed according to a sleepiness level of the driver by setting a smaller coefficient at a higher sleepiness level of the driver. When a sleepiness level is determined by the levels 1 to 5 in the five stages described above, a value of the coefficient is dynamically changed to 0.5, 0.48, . . . , and 0.4 in such a way as to relate to each of the levels 1 to 5.

Further, in setting a reference upper limit value, in the embodiment described above, when a maximum value of a degree of eye opening in the latest certain period of time T is set as the reference upper limit value, the reference upper limit value is updated only in a case in which a sleepiness level of a driver is less than or equal to a predetermined level, but the maximum value of the degree of eye opening in the latest certain period of time T may be set as the reference upper limit value regardless of the sleepiness level of the driver.

According to the present embodiment as described above, a predicted blinking number in the certain period of time T is set to N and an N-th local minimum value from the smallest local minimum value among a plurality of local minimum values in the certain period of time T is set as a reference lower limit value, and thus a decrease in a closed eye determination threshold value can be suppressed even in a case in which variations occur in a degree of eye opening when an eye is closed. Therefore, whether a driver closes an eye can be accurately determined based on the closed eye determination threshold value.

The invention claimed is:

1. A closed eye determination device, comprising:
a processor configured to:
detect a degree of eye opening of a driver from each of a series of face images of a driver in time series in a latest certain period of time being acquired by an imaging device;
extract a local minimum value of the degree of eye opening from a change in time series of the degree of eye opening in the certain period of time;
set, as a reference lower limit value of the degree of eye opening, a local minimum value in order corresponding to a blinking number of a driver in the certain period of time in order from a smallest local minimum value among local minimum values of the degree of eye opening in the certain period of time;
set a closed eye determination threshold value, based on the reference lower limit value;
determine that an eye of a driver is closed when the degree of eye opening detected from an image acquired by the imaging device after the certain period of time is less than or equal to the closed eye determination threshold value;
set, as a reference upper limit value of the degree of eye opening, a maximum value of the degree of eye opening in the certain period of time, wherein
the processor sets, as the closed eye determination threshold value, a value acquired by adding a predetermined ratio of a difference between the reference upper limit value and the reference lower limit value to the reference lower limit value; and
detect a sleepiness level of a driver, wherein
the processor sets the predetermined ratio to be lower at a higher sleepiness level of a driver, and the processor updates the reference upper limit value to the maximum value in the certain period of time when the sleepiness level is less than or equal to a predetermined level, and does not update the reference upper limit value when the sleepiness level exceeds the predetermined level.

2. The closed eye determination device according to claim 1, wherein the processor updates the reference upper limit value to the maximum value in the certain period of time regardless of the sleepiness level when the certain period of time is a period immediately after driving of a vehicle starts.

* * * * *